United States Patent
Kang

(10) Patent No.: US 10,472,809 B2
(45) Date of Patent: Nov. 12, 2019

(54) SYSTEM FOR DISPOSAL OF WASTE CONTAINING FOOD WASTE OR LIVESTOCK MANURE AND PRODUCTION OF ENERGY AND METHOD THEREFOR

(71) Applicant: LOHAS TECH CO., LTD., Wonju (KR)

(72) Inventor: Chul Kyu Kang, Wonju (KR)

(73) Assignee: LOHAS TECH CO., LTD., Wonju (KR)

( * ) Notice: Subject to any disclaimer, the term of this patent is extended or adjusted under 35 U.S.C. 154(b) by 28 days.

(21) Appl. No.: 15/305,757

(22) PCT Filed: Apr. 3, 2015

(86) PCT No.: PCT/KR2015/003347
§ 371 (c)(1),
(2) Date: Oct. 21, 2016

(87) PCT Pub. No.: WO2016/027954
PCT Pub. Date: Feb. 25, 2016

(65) Prior Publication Data
US 2017/0044748 A1    Feb. 16, 2017

(30) Foreign Application Priority Data

Aug. 18, 2014   (KR) ........................ 10-2014-0107139

(51) Int. Cl.
*E03C 1/266*    (2006.01)
*F23G 7/10*     (2006.01)
(Continued)

(52) U.S. Cl.
CPC ............ *E03C 1/266* (2013.01); *B01D 21/262* (2013.01); *B01D 36/045* (2013.01);
(Continued)

(58) Field of Classification Search
CPC .. C02F 3/342; C02F 2303/26; C02F 2303/10; C02F 1/286; C02F 1/283; C02F 1/288;
(Continued)

(56) References Cited

U.S. PATENT DOCUMENTS

| | | | | |
|---|---|---|---|---|
| 5,257,740 A | * | 11/1993 | Prew | B08B 9/083 241/20 |
| 2013/0086837 A1 | * | 4/2013 | Na | B09B 1/00 44/629 |
| 2015/0191751 A1 | * | 7/2015 | Enikeev | C12M 21/12 71/26 |

FOREIGN PATENT DOCUMENTS

KR         101168691 B1 *  7/2012
KR      1020130034555     4/2013
(Continued)

OTHER PUBLICATIONS

International Search Report, dated Jun. 16, 2015 (English Translation).

*Primary Examiner* — Pamela H Weiss
(74) *Attorney, Agent, or Firm* — STIP Law Group, LLC

(57) ABSTRACT

The present invention relates to a system for disposal of waste containing food waste or livestock manure and production of energy and a method therefor, wherein the system can dispose of waste, such as food waste or livestock manure, without using chemical additives or a precipitation bath generally used for disposal of wastewater, and can allow separation of wastewater and solid organic substances from the waste, disposal thereof, and then recycling thereof, respectively.

2 Claims, 2 Drawing Sheets

(51) Int. Cl.
| | |
|---|---|
| C10L 5/40 | (2006.01) |
| C02F 9/00 | (2006.01) |
| B01F 3/04 | (2006.01) |
| B01D 36/04 | (2006.01) |
| C02F 1/38 | (2006.01) |
| B09B 3/00 | (2006.01) |
| B04B 5/10 | (2006.01) |
| F23G 5/033 | (2006.01) |
| B01D 21/26 | (2006.01) |
| B01F 15/06 | (2006.01) |
| C02F 1/461 | (2006.01) |
| F23G 7/06 | (2006.01) |
| C10L 5/46 | (2006.01) |
| C02F 101/30 | (2006.01) |
| C02F 103/20 | (2006.01) |
| C02F 103/32 | (2006.01) |
| C10L 5/42 | (2006.01) |
| C02F 1/28 | (2006.01) |
| C02F 1/463 | (2006.01) |
| C02F 3/34 | (2006.01) |
| C02F 11/08 | (2006.01) |
| C10L 5/44 | (2006.01) |

(52) U.S. Cl.
CPC .......... *B01F 3/04106* (2013.01); *B01F 15/06* (2013.01); *B04B 5/10* (2013.01); *B09B 3/00* (2013.01); *B09B 3/0083* (2013.01); *C02F 1/461* (2013.01); *C02F 9/00* (2013.01); *C10L 5/40* (2013.01); *F23G 5/033* (2013.01); *F23G 7/06* (2013.01); *F23G 7/10* (2013.01); *B01D 2201/00* (2013.01); *B01F 2015/062* (2013.01); *B01F 2215/0003* (2013.01); *B01F 2215/0042* (2013.01); *C02F 1/283* (2013.01); *C02F 1/286* (2013.01); *C02F 1/288* (2013.01); *C02F 1/38* (2013.01); *C02F 1/463* (2013.01); *C02F 3/342* (2013.01); *C02F 11/08* (2013.01); *C02F 2001/46133* (2013.01); *C02F 2101/30* (2013.01); *C02F 2103/20* (2013.01); *C02F 2103/32* (2013.01); *C02F 2303/10* (2013.01); *C02F 2303/26* (2013.01); *C10L 5/42* (2013.01); *C10L 5/442* (2013.01); *C10L 5/46* (2013.01); *C10L 2290/06* (2013.01); *C10L 2290/24* (2013.01); *C10L 2290/54* (2013.01); *F23G 2209/26* (2013.01); *Y02E 20/12* (2013.01); *Y02E 50/10* (2013.01); *Y02E 50/30* (2013.01); *Y02W 10/30* (2015.05)

(58) Field of Classification Search
CPC .. C02F 11/08; C02F 2103/20; C02F 2101/30; C02F 2103/32; C02F 2001/46133; C02F 1/463; C02F 1/38; C02F 9/00; C02F 1/461; B01F 2015/062; B01F 2215/0003; B01F 2215/0042; B01F 3/04106; B01F 15/06; B01D 2201/00; B01D 36/045; B01D 21/262; Y02E 50/10; Y02E 20/12; Y02E 50/30; C10L 5/46; C10L 2290/54; C10L 2290/06; C10L 5/42; C10L 2290/24; C10L 5/442; C10L 5/40; E03C 1/266; B04B 5/10; B09B 3/00; B09B 3/0083; F23G 5/033; F23G 2209/26; F23G 7/10; F23G 7/06; Y02W 10/30
See application file for complete search history.

(56) References Cited

FOREIGN PATENT DOCUMENTS

| KR | 101374528 B1 | * | 3/2014 | |
| WO | WO-2014017945 A1 | * | 1/2014 | ............ C12M 21/12 |

* cited by examiner

SYSTEM FOR DISPOSAL OF WASTE CONTAINING FOOD WASTE OR LIVESTOCK MANURE AND PRODUCTION OF ENERGY AND METHOD THEREFOR

CROSS-REFERENCE TO RELATED APPLICATIONS

This application is the U.S. National Phase under 35 U.S.C. § 371 of International Application No. PCT/KR2015/003347 filed on Apr. 3, 2014, which in turn claims the benefit of Korean Application No. KR 10-2014-0107139, filed on Aug. 18, 2014, the disclosures of which are incorporated by reference into the present application.

TECHNICAL FIELD

The present invention relates to a system for disposal of waste containing food waste and livestock manure and production of energy, and a method thereof and, more particularly to a system for disposal of waste containing food waste and livestock manure and production of energy that can treat waste such as food waste or livestock manure etc. without using a settling tank or chemical additives generally used for disposal of wastewater and that can separate and treat wastewater and solid organic matters from the waste so that they can be recycled, and a method thereof.

BACKGROUND ART

Solid organic matters generated from the treatment of wastes including a waste food or a livestock manure are recycled as a feed, a fuel or a compost etc., after drying thereof. However, since odors are generated from a manure fermentation process, there is a problem in that it causes a civil complaint. Also in case of a high density waste water, since it is treated through a method of adding chemicals therein and depositing suspended solid, there is a problem in that it is not environmentally-friendly. That is, where the waste water is treated through the addition of chemicals, because a salt, a nitrogen, and a phosphorus etc. are neutralized with hazardous chemicals, it is not environmentally-friendly. Also, there is a fermentation digestion process of fermenting organic slurry. However, the waste water and the sludge generated from the production of the biogas cause the second environmental pollution. Moreover, it causes a civil complaint owing to a bad smell generated in the fermentation digestion process. Furthermore, in case of the gaseous fuel, since the investing expense is more significantly increased in comparison with the productivity thereof, it is difficult to commercialize. Also, there is a problem in that it takes 10~31 days for treatment thereof.

Korean Patent Publication No. 10-2011-55442 (Publication Date: May 25, 2011) is provided to a recycling system of organic waste. The technique is characterized in that it divides the organic waste into solid waste and liquid waste, thereby composting the solid waste and liquid-fertilizing the liquid waste; it treats the organic matters with the non-sludge treating manner in the process of the liquefied fertilizer; and it generates a methane gas and an emulsion fuel through the waste oil. However, in the technique, since the resource is generated by mixing anaerobic and aerobic microorganisms thereto in the waste recycling process instead of using the chemicals, it requires separate processes of culturing and inputting microorganisms. Also, since fossil fuels are used through an emulsion device for generating the emulsion fuel by mixing the water to the fuel such as a heavy oil, a diesel, a kerosene or a waste oil, there is a problem in that it is not environmentally-friendly. Moreover, there are problems in that it has a long process time thereof and is difficult to remove salt.

The Korean Patent registration No. 10-1168691 (Registration Date: Jul. 19, 2012) relates to a method and a system for treating a supernatant of a food waste for treating the waste water removed from the food waste. However, there is a problem in that it is difficult to treat the solid organic matters.

DISCLOSURE

Technical Problem

The present invention has been made in an effort to solve the problems of the conceptual description of the conventional art as described above, and an object of the present invention is to provide a system for disposal of waste containing food waste and livestock manure and production of energy that can treat waste such as food waste or livestock manure without using a settling tank or chemical additives generally used for disposal of wastewater and that can separate and treat wastewater and solid organic matters from the waste so that they can be recycled, that can induce a combustion of a gas and a bubble generated from the wastewater by using a solid fuel produced from solid organic substances, and that a heat produced in a combustion furnace is recycled for producing the solid fuel, and a method thereof.

Technical Solution

According to one aspect of the present invention so as to accomplish these objects, there is provided to a system for disposal of waste containing food waste or livestock manure and production of energy, the system including: an inlet hopper through which waste containing waste food, which contains solid organic substances, or livestock manure are put inside; a separator that is disposed at the bottom of the inlet hopper and selectively removes non-flammable substances and inorganic substances from the waste put inside through the inlet hopper; a crusher that crushes the waste with the non-flammable substances and inorganic substances removed into a predetermined size or less; a multistage centrifugal separator that separates the crushed waste from wastewater step by step at different rotational speeds in accordance with sizes of the solid organic substances in the crushed waste; an organism tank that collects the solid organic substances separated from the waste through the multistage centrifugal separator; a mixing heater that uniformly mixes the solid organic substances kept in the organism tank with sawdust supplied from a sawdust supplier and produces an organic mixture by heating the solid organic substances and the sawdust at a predetermined temperature; a producing machine that produces a solid fuel from the organic mixture produced by the mixing heater; a first filter that primarily removes solid organic substances and impurities from the wastewater separated by the multistage centrifugal separator; a bubble generator that produces gas and bubbles by electrolyzing the wastewater passing through the first filter; a second filter that secondarily removes solid organic substances and impurities from the wastewater remaining in the bubble generator; and a combustion furnace that is supplied with the gas and the bubbles produced by the bubble generator and water with impurities secondarily removed through the second filter, and then burns the gas and the bubbles and produces vapor by heating the water with impurities removed.

Also, the combustion furnace produces vapor by burning the solid fuel produced by the producing machine with the gas and bubbles produced by the bubble generator; and the heat generated in the combustion furnace is moved to the mixing heater to be used to produce an organic mixture.

In the meantime, there is provided to a method for disposal of waste containing food waste or livestock manure and production of energy, the method including: putting waste containing waste food, which contains solid organic substances and wastewater, or livestock manure into an inlet hopper (S10); selectively removing non-flammable substances and inorganic substances from the input waste using a separator disposed at the bottom of the inlet hopper (S20); crushing the waste with the non-flammable substances and inorganic substances removed into a predetermined size or less using a crusher (S30); separating the crushed waste from wastewater using a multistage centrifugal separator that separates the crushed waste at different rotational speeds in accordance with sizes of the solid organic substances in the crushed waste (S40); collecting the solid organic substances separated from the wastewater into an organism tank (S61); producing an organic mixture by uniformly mixing the collected solid organic substances with sawdust and then heating them at a predetermined temperature, using a mixing heater (S62); and producing the organic mixture into a solid fuel using a producing machine (S63).

Also, there is provided to a method for disposal of waste containing food waste or livestock manure and production of energy, the method including: putting waste containing waste food, which contains solid organic substances and wastewater, or livestock manure into an inlet hopper (S10); selectively removing non-flammable substances and inorganic substances from the input waste using a separator disposed at the bottom of the inlet hopper (S20); crushing the waste with the non-flammable substances and inorganic substances removed into a predetermined size or less using a crusher (S30); separating the crushed waste from wastewater using a multistage centrifugal separator that separates the crushed waste at different rotational speeds in accordance with sizes of the solid organic substances in the crushed waste (S40); removing the remaining solid organic substances and impurities from the separated wastewater by a first filter (S51); producing gas and bubbles from the wastewater through electrolysis in a bubble generator after the solid organic substances and impurities are primarily removed (S52); secondarily removing solid organic substances and impurities from the wastewater left after producing the gas and bubbles by a second filter (S53); and burning the gas and bubbles and producing vapor by burning the water with solid organic substances and impurities removed in a combustion furnace in a state that the gas and bubbles produced in step S52 and the water with solid organic substances and impurities secondarily removed in step S53 are supplied therein (S70).

In the meantime, the solid fuel produced by the producing machine in step S63 can be supplied to a combustion furnace and the heat produced in the combustion furnace in step S70 can be supplied to a mixing heater so as to produce an organic mixture.

Advantageous Effects

According to the present invention, since wastewater and solid organic substances contained in waste are treated only by a physical sequential configuration without using chemicals or microorganisms, there is no danger of environment contamination. Further, since the solid fuel produced from solid organic substances when water with impurities removed from wastewater is evaporated in the combustion furnace is used and the heat produced in the combustion furnace is used for producing the solid fuel, it is possible to reduce the costs for energy that is supplied from the outside to treat the waste.

BRIEF DESCRIPTION OF DRAWINGS

The above and other objects, features and advantages of the present invention will be more apparent from the following detailed description taken in conjunction with the accompanying drawings, in which.

REFERENCE SIGNS LIST

Figure 1:
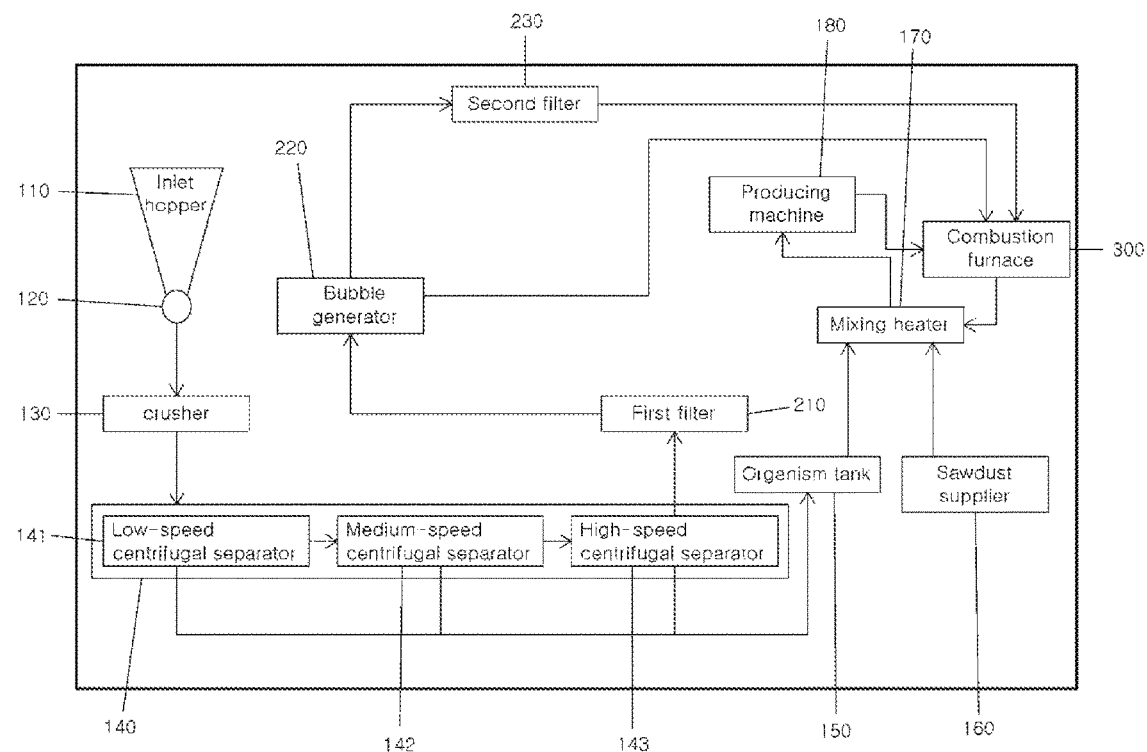
FIG. 1 shows a system for disposal of waste and production of energy according to the present invention. According to the present invention.

110: inlet hopper 1
120: separator
130: crusher
140: multistage centrifugal separator
141: low-speed centrifugal separator
142: medium-speed centrifugal separator
143: high-speed centrifugal separator 143.
150: organism tank
160: sawdust supplier
170: mixing heater
180: producing machine
210: first filter
220: bubble generator
230: second filter
300: combustion furnace

BEST MODE

Mode for Invention

Hereinafter, a preferred embodiment according to the present invention will be described in detail with reference to the accompanying drawings.

FIG. 1 shows a system for disposal of waste and production of energy according to the present invention. According to the present invention, all of the components from an inlet hopper 110 to a producing machine 180 and a combustion furnace 300 are integrated in one structure, but the components may be divided on different floors, depending on their configurations. For example, an inlet hopper 110 may be disposed on the first floor to deliver waste for treatment, a separator 120 for separating non-flammable substances and inorganic substances, a crusher 130, a multistage centrifugal separator 140, an organism tank 150, a sawdust supplier 160, a mixing heater 170, a producing machine 180, a first filter 210, a bubble generator 220, a second filter 230, and a combustion furnace 300 may be disposed sequentially in the order of treating waste on the first basement floor, and a captive tank for temporarily keeping wastewater separated from solid organic matters through the multistage centrifugal separator may be disposed on the second basement floor. An operation room and an office room may be provided on the first floor where the inlet hopper is disposed, and an exhaust vent line for discharging final discharge gas treated through the combustion furnace may be formed from the first basement floor to the first floor. Further, the entire structure may be equipped with facilities for collecting an offensive odor to keep the offensive odor from leaking out of the structure.

The inlet hopper 110, which is provided for putting waste containing food waste and livestock manure into the system of the present invention through the inlet at the top, is formed in an inverse conical shape and has an input unit for taking external air inside at the top and an outlet unit for discharging an offensive odor from the inlet hopper. When external air is forcibly taken inside at any side of the top of the inlet hopper, an offensive odor can be discharged at the opposite side, so the offensive odor can be effectively collected with the flow maintained in one direction. The input unit for taking external air inside may be composed of a blower and a pipe and the output unit may also be composed of a blower and a pipe, in which the pipes may be connected to a top cap of the inlet hopper.

The separator 120 is disposed at the bottom of the inlet hopper and removes non-flammable substances or inorganic substances from waste discharged by a predetermined amount through the outlet at the bottom of the inlet hopper. The separator, which is provided to remove impurities or non-flammable substances from organic substances contained in waste, may be a common separator equipped with a conveyer, a disc, and a driving shaft, etc. For example, it can separate non-flammable substances from waste using air forcibly injected by buoyant sediment and/or remove inorganic substances on the basis of differences in weight using a wind separator to remove waste vinyl, etc.

The crusher 130 crushes the waste with non-flammable substances and inorganic substances removed through the separator into a predetermined size or less. When relatively large lumps of waste such as a watermelon are in solid organic substances contained in waste, not only it is difficult to take out condensed wastewater in the solid organic substances, but machines may break due to overload in disposal of the waste. The present invention allows for smoothly discharging wastewater in solid organic substances in waste and preventing breakdown of machines for post processes by maintaining the size of the solid organic substances contained in waste in a 5 cm or less diameter.

The multistage centrifugal separator 140, which is provided for separating waste from wastewater step by step using different rotational speeds of crushed waste and different sizes of solid organic substances in the crushed waste, may be largely composed of a low-speed centrifugal separator 141, a medium-speed centrifugal separator 142, and a high-speed centrifugal separator 143. However, it may be possible to change the number of the centrifugal separators, solid organic substances can be separated through the centrifugal separators in accordance with rotational speeds and the sizes thereof, and wastewater can be separated and then filtered through the first filter 210 and the second filter 230, which are described below.

The low-speed, medium-speed, and high-speed centrifugal separators can be differentiated by the difference of relative speeds and the size of organic substances to be separated and may be configured in consideration of the characteristics of organic substances that they can separate, such as the size, shape, or weight of the organic substances. According to the present invention, by reducing load in the centrifugal separators step by step using the multistage centrifugal separator rather than separating solid organic substances and wastewater using a single centrifugal separator, it is possible to prevent breakdown and improve the ability to separate solid organic substances and wastewater.

For example, when the multistage centrifugal separator used in the present invention is a die-can type solid liquid centrifugal separator, a can having a predetermined radius from the center of a driving shaft has a hole, and solid and liquid are separated while the die-can is rotated about the driving shaft. As for the low-speed centrifugal separator 141, a hole is formed within 10-20 mm and the rotational speed is made into 800-1200 rpm so that solid organic substances having a diameter over 10-20 mm are separated and the other solid organic substances and wastewater are separated through the hole.

As for the medium-speed centrifugal separator 142, a hole is formed within 0.1-0.2 mm and the rotational speed is made into 2500-3500 rpm, and particularly double nets having different diameters are formed so that different rotational speeds is achieved within the speed range, whereby butterfat components, organic substances and wastewater that have different weights and molecular characteristics can be separated. The medium-speed centrifugal separator is configured to separate solid organic substances having a diameter over 0.1-0.2 mm and, as for the high-speed centrifugal separator 143, a hole is formed within 0.001-0.002 mm and the rotational speed is made within 5000-6000 rpm so that solid organic substances having a diameter over 0.001-0.002 mm can be separated.

The solid organic substances separated by the multistage centrifugal separator 140 is carried and temporarily kept in the organism tank 150, and the wastewater and the solid organic substances and impurities having sizes of 0.001-0.002 mm and contained in the wastewater are filtered again through the first filter.

The organism tank 150 is a part where solid organic substances separated from wastewater through the multistage centrifugal separator are collected, and the solid organic substances separated through the low-speed centrifugal separator 141, the medium-speed centrifugal separator 142, and the high-speed centrifugal separator 143 are sequentially carried and kept in the organism tank, and are then produced into a solid fuel through the mixing heater 170 and the producing machine 180 that are described below.

The mixing heater 170 produces an organic mixture by uniformly mixing the solid organic substances in the organism tank and the sawdust from the sawdust supplier 160 and then heating them at a predetermined temperature. The sawdust supplied from the sawdust supplier is a flammable material and absorbs and disperses water in the solid organic substances in the organism tank and is used to increase thermal efficiency when organic substances are produced into a solid fuel. The mixing ratio of the solid organic substance and the sawdust is 0.25-1:1 so that the sawdust to be mixed is much than the organic substances to minimize atmospheric and environmental contamination when they are burned.

Heating by the mixing heater may be performed for 5-10 minutes at temperature of 80-90° C. such that water in the organic mixture of solid organic substances and sawdust can be maintained within a range of 10-25%. When water is contained less than 10%, molding by the producing machine 180 may not be performed well, but when water is contained over 25%, combustion may not be performed well in the combustion furnace 300 to be described below due to too much water.

The producing machine 180 is used to produce the organic mixture heated with water reduced through the mixing heater into a solid fuel having a predetermined shape. The solid fuel may be produced in various shapes and sizes, if necessary, such as a pellet type or a briquette type that is generally used. The solid fuel produced by the producing machine may be used as fuel for heating in the combustion furnace or may be discharged outside for sale.

The first filter 210 is used to primarily remove solid organic substances and other impurities remaining in the wastewater separated through the multistage centrifugal separator 140. The bubble generator 220 and the second filter 230 to be described below are required to purify remaining wastewater with solid organic substances separated from the supplied waste, including the first filter, and wastewater is filtered into purified water through these devices.

For the first filter 210, various filters may be used, but in the present invention, for example a biofilter using enzymes, an activated carbon filter including activated carbon, or a wooden filter using the adsorbing and filtering property of bark. When such a biofilter, activated carbon filter, or wooden filter is used as the first filter, the first filter is formed in a set of at least three stages. Solid organic substances and impurities of 0.001-0.002 mm are contained in the wastewater passing through the high-speed centrifugal separator 143 of the multistage centrifugal separator and it is required to make filters in a multistage structure in order to remove the solid organic substances and impurities.

According to the present invention the first filter is formed in a set of three to five stages so that fine solid organic substances and impurities remaining in wastewater can be effectively removed. For example, when the first filter is formed in a set of three stages, wastewater passing through the first stage passes through the second stage and then passes through the third stage, so it can be changed into wastewater with the concentration of solid organic substances and impurities reduced.

The bubble generator 220 produces gas and bubbles by electrolyzing the wastewater passing through the first filter, and the produced gas and bubbles are carried and burned in the combustion furnace 300, so they act as fuel that can heat and evaporate the water purified through the second filter 230. When water is electrolyzed, oxygen ($O_2$) is produced at the anode and hydrogen ($H_2$) is produced at the cathode, and for example, when the cathode plate is made of a titanium alloy and the anode plate is made of aluminum, a large amount of fine bubbles are produced with dissolution of the aluminum of the anode plate.

Accordingly, the hydrogen and oxygen produced by electrolysis are bonded to the fine bubbles produced with dissolution of aluminum and moved up, while some of the produced gas not bonded to the fine bubbles move with the fine bubbles into the combustion furnace 300 through a passage and then they are burned therein. They generate heat by functioning as an energy source in combustion, the water passing through the second filter is heated by the heat, and the heat is provided to the mixing heater, so energy consumption can be minimized.

According to the bubble generator 220, the some of the fine solid organic substances and impurities passing through the first filter is moved up with the produced bubbles and, the gas and bubbles are moved and burned together in the combustion furnace.

The second filter 230 secondarily removes the impurities in the wastewater remaining in the bubble generator, may be, similar to the first filter 210, a biofilter using enzymes, an activated carbon filter including activated carbon, or a wooden filter using the adsorbing and filtering property of bark, and may be formed in a multistage. However, it may be formed in several stages less than the first filter, for example, in a set of two to three stages.

The wastewater with the concentration reduced through the first filter further decreases in concentration through the bubble generator and the second filter having several stages less than the first filter can finally filter the wastewater. The wastewater passing through the second filter may be discharged as it is with most solid organic substances and impurities removed, but according to the present invention, the water filtered through the second filter is moved and evaporated in the combustion furnace to generate electricity using the vapor produced during evaporation. Further, noxious exhaust gas that may be produced while a solid fuel is burned in the combustion furnace may be filtered by the vapor to prevent noxious components such as dioxin from being dispersed into the air.

The combustion furnace 300 is supplied with the gas and bubble produced by the bubble generator and the water with solid organic substances and impurities secondarily removed through the second filter and then burns the gas and bubbles and produces heat and vapor by heating the water with impurities removed. In particular, the combustion furnace produces vapor by burning the solid fuel produced by the producing machine 180 with the gas and bubbles produced by the bubble generator, and the heat generated in the combustion furnace is moved to the mixing heater 170 to be used to produce an organic mixture.

Figure 2:
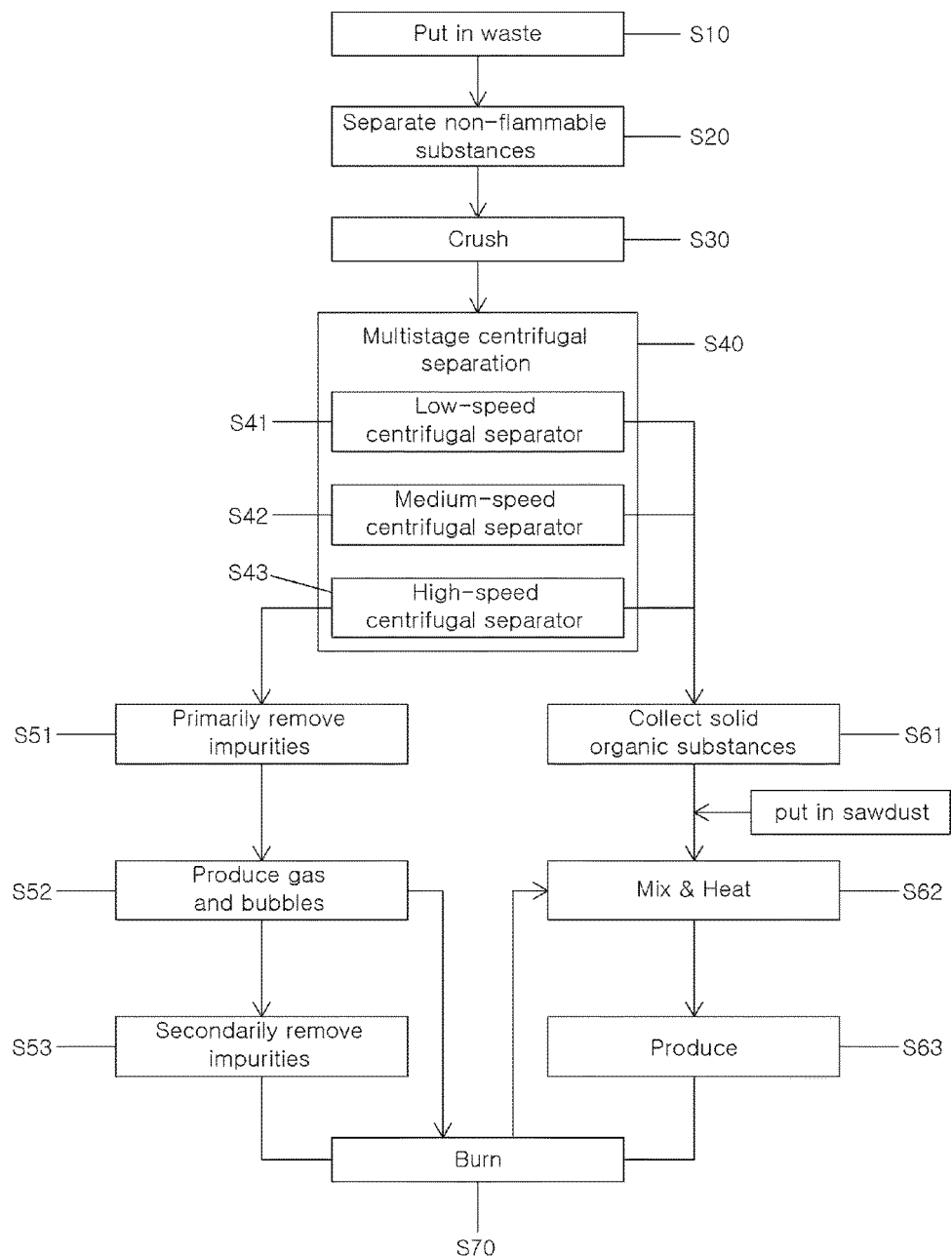
FIG. 2 is a flowchart illustrating a method of treating waste and producing energy according to the present invention.

FIG. 2 is a flowchart illustrating a method of treating waste and producing energy according to the present invention, in which it can be seen that a solid fuel is produced and wastewater can be treated while waste is treated by the configuration shown in FIG. 1.

According to the present invention, first, waste containing waste food or livestock manure in which solid organic substances and wastewater are contained is put into the inlet hopper 110 (S10). The inlet hopper 110, which is provided for putting waste containing food and livestock manure into the system of the present invention through the inlet at the top, is formed in an inverse conical shape and, if necessary, may be equipped with an exhaust amount adjuster at the outlet at the bottom so that the amount of waste to be discharged into the separator can be adjusted.

After waste is put into the inlet hopper, non-flammable substances and inorganic substances are removed from the waste by the separator at the bottom of the inlet hopper (S20). As the non-flammable substances and inorganic substances such as iron or non-ferrous metal and waste vinyl are separated and removed, breakdown of the crusher is prevented in the process of crushing and impurities are prevented from being contained in the process of manufacturing a solid fuel.

After the non-flammable substances and inorganic substances are removed, the remaining waste is crushed into a predetermined size or less by the crusher (S30). The crusher 130 crushes the waste with non-flammable substances and inorganic substances removed through the separator into a predetermined size or less and crushes the solid organic substances in the waste into a predetermined size or less, whereby the wastewater remaining in the solid organic substances can be smoothly discharged in centrifugal separation and the processes for post treatment can smoothly progress.

After the waste is crushed into a predetermined size or less, the crushed waste is separated from wastewater by the multistage centrifugal separator that separates waste at different rotational speeds and separates wastewater step by step in accordance with the sizes of the solid organic substances in the waste (S40). According to the present invention, waste is sequentially put into the centrifugal separator with three stages of a low speed, a medium speed, and a high speed, and the holes are made different with the rotational speed or a double net having different rotational speeds is configured in the same centrifugal separator, for example, the medium-speed centrifugal separator in order to more easily separate the components of the waste. Further, the rotational speed is gradually increased or the hole is reduced in size so that even small solid organic substances can be separated through the multistage centrifugal separation.

After the multistage centrifugal separation, the waste is treated separately for solid organic substances and wastewater.

As for the process of producing a solid fuel from solid organic substances, first, the solid organic substances separated from the wastewater through the multiple centrifugal separation are collected and temporarily kept in the organism tank 150 (S61). According to the multistage centrifugal separation, solid organic substances are separated in accordance with sizes through low-speed centrifugal separation (S41), medium-speed centrifugal separation (S42), and high-speed centrifugal separation (S43), and the separated solid organic substances are collected in the organism tank at each centrifugal separation.

Thereafter, sawdust is uniformly mixed with the solid organic substances collected in the organism tank 150 and they are heated at a predetermined temperature to produce an organic mixture (S62). The mixing heater 170 produces an organic mixture by uniformly mixing the solid organic substances kept in the organism tank and the sawdust supplied from the sawdust supplier 160 and then heating them at a predetermined temperature, in which the sawdust supplied from the sawdust supplier is a flammable material and is mixed to absorb and disperse the water in the solid organic substances kept in the organism tank and increase the thermal efficiency in the process of producing organic substances into a solid fuel.

Heating by the mixing heater is performed at temperature of 80-90° C. to prevent ignition of the organic mixture due to overheating, and accordingly, it is possible to easily adjust the water in the organic mixture within 10-25%, smoothly perform producing, and also smoothly perform burning in the process of combustion.

After the organic mixture is produced, the organic mixture is produced into a solid fuel by the producing machine 180 (S63). The producing machine 180 is used to produce a solid fuel in a predetermined shape from organic substances, in which the solid fuel can be produced in various shapes and sizes, as required, such as a pellet type or a briquette type that is generally used. Further, the solid fuel can be used as fuel for combustion in the combustion furnace or may be discharged outside for sale.

As for the process of purifying and burning the wastewater that has undergone multistage centrifugal separation, first, the remaining solid organic substances and impurities having sizes of 0.001-0.002 mm are primarily removed from the separated wastewater by the first filter (S51). The first filter 210, which is used to primarily remove the remaining solid organic substances and impurities from the wastewater separated through the multistage centrifugal separator 140, may be, as described above, a biofilter using enzymes, an activated carbon filter including activated carbon, or a wooden filter using the adsorbing and filtering property of bark and has a multistage structure for effectively removing solid organic substances and impurities.

After the solid organic substances and impurities are primarily removed, gas and bubbles are produced from the wastewater through electrolysis in the bubble generator 220 (S52). In the bubble generator 220 that produces gas and bubbles by electrolyzing the wastewater passing through the first filter 210, the cathode plate is made of a titanium alloy and the anode plate is made of aluminum for electrolysis so that a large amount of fine bubbles are produced with dissolution of the aluminum of the anode plate. The fine bubbles are moved up with hydrogen gas and oxygen gas produced by electrolysis or moved up with hydrogen and oxygen contained therein, in which some remaining fine solid organic substances and impurities are also moved up to be sequentially carried into the combustion furnace.

Thereafter, solid organic substances and impurities are secondarily removed from the wastewater left after producing the gas and bubbles by the second filter 230 (S53). The second filter may also be the filters described above for the first filter, but since it finally filters the wastewater with the solid organic substances and impurities removed through the first filter and the bubble generator, it may be formed in several stages less than the first filter. Water with the remaining solid organic substances and impurities removed through the second filter is sent into the combustion furnace and evaporated into vapor therein.

Thereafter, the combustion furnace 300 is supplied with the gas and bubbles produced in step S52 and the water with solid organic substances and impurities secondarily removed in step S53 and then burns the gas and bubbles and produces vapor by burning the water with solid organic substances and impurities removed (S70). If necessary, the combustion furnace may be supplied with fuel from the outside to evaporate water, but it can be operated with minimum fuel from the outside by using the solid fuel produced in the process of producing.

That is, combustion may be performed after the solid fuel produced by the producing machine in step S63 is supplied to the combustion furnace, or the heat produced in the combustion furnace in step S70 is supplied for step S62 to produce an organic mixture, so the input waste can be changed into energy for recycling in the present invention.

The water with solid organic substances and impurities finally filtered in step S53 is evaporated by being heated in the process of combustion and the vapor may be used for generating electricity or removing noxious substances such as dioxin in the exhaust gas finally discharged through the exhaust vent line. That is, when the vapor produced in the process of combustion is made flow downward from above through the exhaust vent line, the vapor with water filters the exhaust gas, so it is possible preventing noxious substances from dispersing into the air.

According to the present invention, since wastewater and solid organic substances contained in waste are treated only by a physical sequential configuration without using chemicals or microorganisms, there is no danger of environment contamination. Further, since the solid fuel produced from solid organic substances when water with impurities removed from wastewater is evaporated in the combustion furnace is used and the heat produced in the combustion furnace is used for producing the solid fuel, it is possible to reduce the costs for energy that is supplied from the outside to treat the waste.

While the present invention has been described with respect to the specific embodiments, it will be apparent to those skilled in the art that various changes and modifications may be made without departing from the spirit and scope of the present invention as defined in the following claims.

INDUSTRIAL APPLICABILITY

The present invention relates to a system for disposal of waste containing food waste and livestock manure and production of energy that can treat waste such as food waste or livestock manure without using a settling tank or chemical additives generally used for disposal of wastewater and that can separate and treat wastewater and solid organic matters from the waste so that they can be recycled, that can induce a combustion of a gas and a bubble generated from the wastewater by using a solid fuel produced from solid organic substances, and that a heat produced in a combustion furnace is recycled for producing the solid fuel, and a method thereof, which are usefully utilized in the field thereof.

The invention claimed is:

1. A system for disposal of waste containing food waste or livestock manure and production of energy, the system comprising:
   an inlet hopper through which waste containing waste food or livestock manure are put inside, wherein the waste food contains solid organic substances;
   a separator that is disposed at the bottom of the inlet hopper, wherein the separator selectively removes non-flammable substances and inorganic substances from the waste put inside through the inlet hopper;
   a crusher that crushes the waste with the non-flammable substances and inorganic substances removed into a predetermined size or less;
   a multistage centrifugal separator that separates the crushed waste from wastewater step by step at different rotational speeds in accordance with sizes of the solid organic substances in the crushed waste;
   an organism tank that collects the solid organic substances separated from the waste through the multistage centrifugal separator;
   a sawdust supplier that supplies sawdust;
   a mixing heater that uniformly mixes the solid organic substances kept in the organism tank with the sawdust supplied from the sawdust supplier and produces an organic mixture by heating the solid organic substances and the sawdust at a predetermined temperature;
   a solid fuel producing machine, wherein the solid fuel producing machine produces a solid fuel by pelletizing or briquetting the organic mixture produced by the mixing heater;
   a first filter that primarily removes solid organic substances and impurities from the wastewater separated by the multistage centrifugal separator;
   a bubble generator that produces gas and bubbles by electrolyzing the wastewater passing through the first filter;
   a second filter that secondarily removes solid organic substances and impurities from the wastewater remaining in the bubble generator; and
   a combustion furnace that is supplied with the gas and the bubbles produced by the bubble generator and water with impurities secondarily removed through the second filter, and then burns the gas and the bubbles and produces vapor by heating the water with impurities removed.

2. The system for disposal of waste containing food waste or livestock manure and production of energy as claimed in claim 1,
   wherein the combustion furnace produces vapor by burning the solid fuel produced by the producing machine with the gas and bubbles produced by the bubble generator; and
   the heat generated in the combustion furnace is moved to the mixing heater to be used to produce an organic mixture.

* * * * *